July 21, 1931.  A. A. WIEDMAIER  1,815,689

TRANSMISSION

Filed Nov. 23, 1929

INVENTOR.

Arthur A. Wiedmaier

BY

Sleugh and Canfield

ATTORNEY.

Patented July 21, 1931

1,815,689

UNITED STATES PATENT OFFICE

ARTHUR A. WIEDMAIER, OF CLEVELAND HEIGHTS, OHIO, ASSIGNOR TO THE WIEDMAIER COMPANY, OF CLEVELAND HEIGHTS, OHIO, A CORPORATION OF OHIO

TRANSMISSION

Application filed November 23, 1929. Serial No. 409,391.

This invention relates to transmissions and particularly to transmissions comprising arrangements of gearing adapted to be disposed within the rear axle of an automobile.

One of the objects of this invention is to provide an improved variable speed gearing for automobile rear axles.

Another object of this invention is to provide what is commonly known in the trade as an "over drive" mechanism adapted to be disposed within the rear axle of an automobile for the purpose of effecting a change of gear ratio between the driving and driven elements of the rear axle.

Another object is to provide an improved variable speed gearing for automobile rear axles, by which the rear wheels of the vehicle may be optionally driven at a higher rate of speed relative to the rate of rotation of the propeller shaft transmitting power from the engine to the rear axle.

Another object is to provide a differential gearing mechanism for the rear axle of an automobile and comprising the usual ring gear, spider, pinions and differential bevel gears, whereby the rear wheels of the automobile may normally be driven at the rotational velocity of the ring gear and comprising also an improved planetary gear system by which the rear wheels of the automobile may, optionally, be driven at a higher rotational velocity than that of the ring gear.

Another object is to provide a differential gear mechanism of the class described in which the force reactions developed in use will be efficiently absorbed in suitably disposed bearings and the parts of which may be associated together in an efficiently operating durable structure.

Other objects of my invention and the invention itself will become apparent by reference to the following description of an embodiment of my invention and in which description reference may be had to the drawings illustrating the said embodiment.

Figure 1:
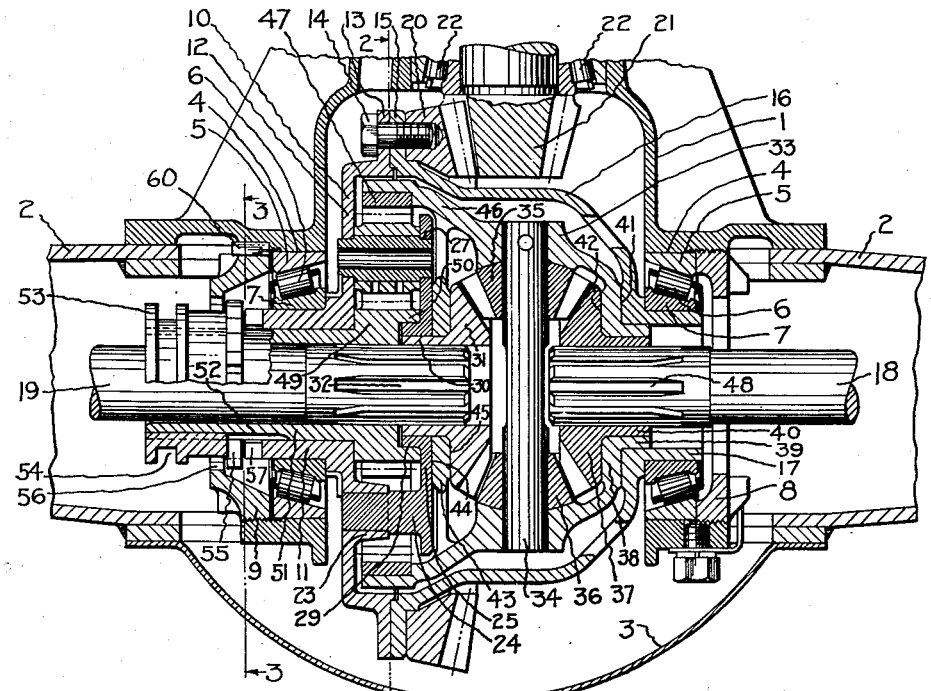
Fig. 1 is an approximately horizontal cross-sectional view of an embodiment of my invention taken approximately along the medial plane of the rear axle shafts of an automobile.
Figure 2:
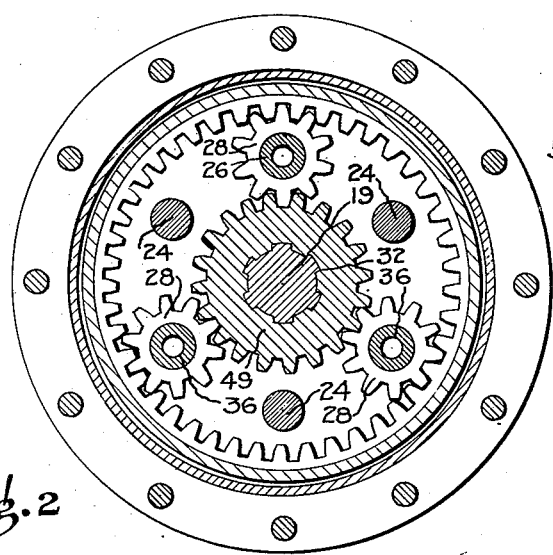
Fig. 2 is a cross-sectional view taken approximately from the plane 2 of Fig. 1.
Figure 3:
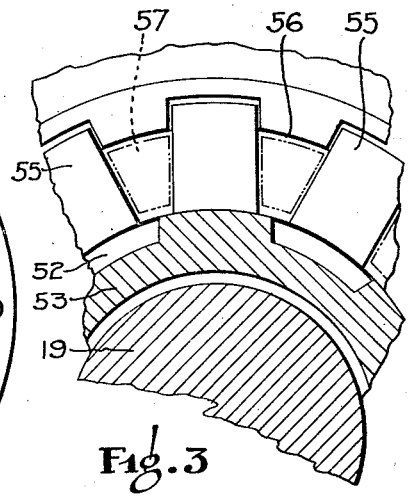
Fig. 3 is a fragmentary view to an enlarged scale taken approximately from the plane 3 of Fig. 1 and with parts forwardly of the sectional plane being indicated in broken lines.

Referring to the drawing, I have shown at 1 the forward portion of a differential housing, to be more fully described, and connected by bolts or otherwise to a steel axle housing having right and left axle portions 2—2 of the usual or any preferred construction. The rear of the housing is closed by a cover plate 3.

The housing 1 has coaxial bores 4—4 in which are seated outer roller bearing races 5—5 on which run roller bearings 6—6, preferably of the tapered type and coacting with inner races 7—7. The outer races 5 are adjustably positioned by screw-threaded retaining means 8 and 9 screw-threaded into the outer ends of the bores 4—4.

At 10 is a planet gear carrier having a tubular portion 11, the outer cylindrical surface of which is supported in one of the inner races 7 and having a radially extending flange portion 12 terminating outwardly in an inwardly axially off-set flange 13. Bolted to the off-set flange 13 by bolts 14 is the flange 15 of a gear housing 16 generally of cup form, the wall of which extends generally axially and the bottom of the cup having an outwardly directed tubular portion 17, the outer cylindrical surface of which is supported in the other inner race 7 above referred to. The pinion gear carrier 10 and the gear housing 16 joined by the bolts 14 thus form a rigid enclosing and supporting housing for purposes to be described, and mounted for rotation on the ball bearings 6—6 about an axis of rotation which, as will be later understood, is the axis of axle shafts 18 and 19, to be referred to later.

The bolts 14 pass through suitable perforations in the flanges 13 and 15 as above described and are screw-threaded into the annular body of a ring gear 20 which is thus rigidly secured to the housing 10—16 and may rotatively drive it from its meshed relation to a pinion 21 rotating in suitable bearings indicated at 22—22 and connected by parts, not shown, to the propeller shaft of the automobile.

The flange portion 12 of the planet gear carrier 10 is provided with a plurality, such as three, equally spaced bored bosses 23, in the bores of which are press-fitted reduced portions of risers 24 formed on a disk-like base or support 25; and alternating with the risers 24 are hollow pinion bushing bearings 26, one end of each bearing 26 having a reduced portion or neck 27 riveted or press-fitted into a corresponding perforation in the support 25 and the other end similarly secured to the flange portion 12.

Upon the bearings 26 are rotatably mounted planet gears 28 having hub portions abutting upon the opposite or confronting faces of the flange portion 12 and base 25. The risers 24 thus serve to rigidly secure the base 25 to the flange portion 12 in spaced relation therefrom and the base and flange thus positioned serve as a mounting for the planet gears 28, whereby the gears 28 have a rotary bearing connection upon the flange portion 12.

The base or support 25 has an inwardly directed hollow cylindrical flange 29 into the inner cylindrical wall of which extends the hub 30 of one of the differential bevel gears 31, which gear is secured as by splines 32 to the axle shaft 19, referred to above.

The so-called differential spider indicated generally at 33 has mounted therein a bearing pin 34 extending transversely with respect to the axle axis and has rotatably mounted thereon a pair of differential pinions 35 and 36 meshed with the differential bevel gear 31, above referred to, and also with the other differential bevel gear 37.

The differential spider 33 has a transverse portion 38 formed to have an axially directed hollow cylindrical flange 39, into the inner cylindrical portion of which extends the hub 40 of the differential bevel gear 37. The outer cylindrical surface of the flange 40 engages the inner cylindrical surface of the flange 17 of the gear housing, hereinbefore described. The hub 40 of the differential bevel gear 37 is secured as by splines 48 to the axle shaft 18, above referred to. The transverse portion 38 abuts between the housing 16 and bevel gear 37 at 41 and 42, respectively.

The spider 33 also has a transverse portion 43 through an axial bore of which the hub 30 of the differential bevel gear 31 extends and the flange portion 43 abuts against the base 25 and bevel gear 31 at 44 and 45, respectively.

The spider 33 also has a generally axially extending cup shaped portion 46 internally of the open end of which is secured an orbit gear 47 meshed with the planet gears 28. At 49 is a sun gear, the teeth of which are meshed with the teeth of the planet gears 28. The sun gear 49 has an axially directed internally cylindrical flange portion 50 into which the outer cylindrical surface of the flange 29 extends; and the sun gear has an axially extending hollow tubular body portion 51, the internal bore of which surrounds the shaft 19 and the external cylindrical surface of which enters the inner cylindrical surface of the tubular portion 11 of the planet gear carrier, above described. The outer end of the tubular portion 51 is splined, as at 52, upon which is axially reciprocable a clutch shifter 53, having an annular groove 54 into which suitable radially directed trunnions may project to shift the shifter axially.

The shifter 53 on its inner end is provided with a plurality of externally directed teeth 55 which, upon movement of the shifter to the left, as viewed in Fig. 1, may engage corresponding inwardly radially directed teeth 56 in the retainer 9, which is rigidly secured to the housing 1; and the teeth 55, when the shifter 53 is shifted to the right, as viewed in Fig. 1, may alternatively engage axially directed teeth 57 on the end of the tubular portion 11, above described.

The means for shifting longitudinally the shifter 53 is not shown for the sake of simplicity herein and is not deemed necessary, inasmuch as the means for shifting a clutch device by means of a groove or track, such as that shown at 54, is well understood in the art. I prefer to provide means whereby the shifter 53 may be shifted by the driver of the automobile from the seat.

It will be observed that in the gearing mechanism, above described, there is provided what may be called a planetary gearing system comprising the sun gear 49, the plurality of planet gears 28 meshed therewith, and the orbit gear 47 meshed with the planet gears. Also, there is provided clutch means operated by the shifter 53 by which the sun gear 49 may be optionally and alternately rigidly locked either to the ring gear 20 or to the stationary frame or housing of the differential mechanism through the retainer 9.

In the operation of my invention, the shifter 53 is normally shifted to the right hand position, as viewed in Fig. 1, above referred to. In this position, the mechanism as a whole functions similarly to the usual differential gearing mechanism. The driving pinion 21 rotatably drives the ring gear 20; and the ring gear by means of the teeth 57 on the tubular portion 11 meshed with the teeth 55 of the shifter 53 is locked with the sun gear 49 by means of the splined connection 52 between the shifter 53 and the tubular portion 51 of the sun gear.

With the parts in this position, power transmitted to the ring gear 20 rotates it about the axle axis, the ring gear 20 being supported by the roller bearings 6—6 through the planet gear carrier 10 and gear housing 16, as above described.

During its rotation, the sun gear 49 locked to it rotates with it and the planet gears 28 meshed with the sun gear 49 therefore have no movement on their bearings 26 and therefore the orbit gear 47 meshed with the planet gears also rotates bodily with the sun gear and therefore bodily with the ring gear. Thus, the planetary system functions to transmit power from the ring gear 20 to the spider 33 at unitary velocity ratio, that is the spider 33 having the same rotational velocity as if it were connected directly to the ring gear 20.

The rotation of the spider 30 causes it to transmit power to the axle shafts 18 and 19 through the differential pinions 35 and 36 and differential bevel gears 31 and 37 similar to the manner of the usual differential gearing of an automobile rear axle. Upon those occasions when one bevel gear 31 or 37 rotates relative to the other, the said differential bevel gears have rotary bearing support by means of their hubs 30 and 40, respectively, above described.

The bevel gears 31 and 37 are retained inwardly to maintain the teeth thereof in mesh with the teeth of the differential pinions 35 and 36 by their abutting engagement at the surfaces 45 and 42 above described, and the spider 33 is also prevented from shifting axially by the abutting surfaces 44 and 41, above described.

The operation thus far described refers to the ordinary or general differential functions of the mechanism when the running speeds of the automobile are those within the range possible with the regularly used transmission gears ordinarily disposed between the engine and the propeller shaft, which is connected to the driving pinion 21.

By the employment of my invention, as will now be described, the velocity ratio of transmission between the ring gear 20 and axle shafts 18 and 19 may be increased, that is, the shafts 18 and 19 may be "over-driven" to cause them to rotate at higher speeds, and in this respect my invention operates as follows:

On shifting the shifter 53 toward the left as viewed in Fig. 1, the teeth 55 are disengaged from the teeth 57 and engaged with the teeth 56, which, as above stated, are on the retainer 9 rigidly connected to the stationary housing 1. This connects the sun gear 49 through the splines 52 and shifter 53 and teeth 55—56, to the housing 1 and prevents its further rotation. Now, the rotation of the ring gear 20 and the planet gear carrier 10 carries the planet gears 28 around the stationary sun gear 49 with which their teeth are inwardly meshed, causing them to rotate on their bearings 26 and causing them to in turn revolve the orbit gear 47 with which their teeth are outwardly meshed, and as will be understood from the functions of a planetary system of this kind, the orbit gear 47 and spider 33 to which it is connected will rotate at a higher velocity than the ring gear 20. The rotation of the spider 33 will cause it to function through the differential pinions and bevel gears above described, as before, but at the new higher velocity.

During the transmission of power from the ring gear and from the planet gear carrier 10 to the planet gears 28, the rigid connection of the support 25 to the planet gear carrier 10 by means of the risers 24 provides a rigid support for the bearings 26 of the planet gears 28, whereby they are maintained in axial alignment.

It will also be observed from the foregoing construction that the sun gear 49 is maintained in its axially disposed position between the planet gear carrier 10 and the base 25.

Again, by the foregoing construction the differential pinions and bevel gears are maintained in their correct axial positions between the flanges 43 and 38 of the spider 33 and that all of the parts of the gearing mechanism are maintained in their axially disposed operative positions between the planet gear carrier 10 and the gear housing 16.

The bevel gear 37 and the spider 33 at the right end of the mechanism, as viewed in Fig. 1, are supported substantially directly by the bearings 6. The bevel gear 31, however, and the left hand portion of the spider 33 are relatively remote from the other bearing 6 and to support them and in turn to support the orbit gear 47 and maintain the said parts in alignment, the hollow cylindrical flange on the base 25 serves as a supporting bearing, supporting directly the bevel gear 31 by means of its hub 30 and thereby supporting the spider through its flange 43; and the flange 29 is in turn supported by the base 25 which is rigidly secured to the flange 12 by the risers 24. Thus, the supporting effect of the left hand bearing 6 is transmitted by an unyielding structure to the bevel gear 31 and spider 33.

It will, therefore, be seen that the provision of the base 25 and its rigid connection to the flange 12 serves not merely as one of the bearing supports for the planet gears 28, but serves as a central bearing support for substantially the entire mechanism within the housing 16 to prevent the same from sagging or shifting out of axial alignment.

The subject matter of this application is in part a continuation of the subject matter of my pending application, Serial No. 362,775, filed May 13, 1929.

My invention is not limited to the exact details of construction shown and described, inasmuch as many changes therein and modifications thereof may be made and without departing from the spirit of my invention or sacrificing its advantages.

In the foregoing description, I have described my invention as applied to the rear axle of an automobile, because at the present time it is the more common practice to drive vehicles such as automobiles through the rear axle. It will, of course, however, be understood that my invention is applicable with all of its advantages to a vehicle driven through the front axle and to any class or type of power transmission in which two shafts or axles are driven differentially.

Furthermore, while I have shown and described my invention as employed in connection with a pinion and ring gear type of drive, it will be understood by those skilled in this art that my invention is equally applicable to those types of drive in which a worm and worm gear are employed.

I claim:

1. In an axle driving mechanism for motor vehicles, a pair of axle sections to be driven, a differential gear mechanism interposed between and adapted to differentially drive the sections, means for transmitting power to the differential mechanism, said means comprising an orbit gear connected to the differential mechanism, a plurality of planet gears meshed therewith, a sun gear disposed within the planet gears and meshed therewith, a ring gear, a driving pinion meshed with the ring gear and a mounting for the planet gears associated with the ring gear, said mounting including an annular support for the ring gear, an annular base, the base being rigidly connected to the support in parallel spaced relation therefrom by a plurality of risers connecting them and a plurality of planet gear bearing elements connecting the base and annular support, the said base being disposed between the planet gears and the gears of the differential mechanism.

2. In an axle driving mechanism for motor vehicles, a pair of axle sections to be driven, a differential gear mechanism interposed between and adapted to differentially drive the sections, means for transmitting power to the differential mechanism, said means comprising an orbit gear connected to the differential mechanism, a plurality of planet gears meshed therewith, a sun gear disposed within the planet gear and meshed therewith a ring gear, a driving pinion meshed with the ring gear and a mounting for the planet gears associated with the ring gear, said mounting including a driven element connected to the ring gear disposed transversely of its rotational axis, a base element in substantially parallel spaced relation thereto, a plurality of spacers disposed around the said axis and rigidly joining the driven element and base element and a plurality of planet gear bearing elements extending from the driven element to the base element and in spaced relation around the said axis, the said base element being disposed between the planet gears and the gears of the differential mechanism.

3. In a driving mechanism for motor vehicles, a pair of axle sections adapted to be driven, a differential gear mechanism interposed between and adapted to differentially drive the sections, said differential gearing mechanism including a gear on each axle section, an intermediate gear meshed with both of said gears and a spider rotatable on an axis substantially parallel to said axle sections and rotatably supporting said intermediate gear, an orbit gear connected to the spider and rotatable therewith, a set of planet gears meshed with said orbit gear and disposed around the rotational axis of the spider, a sun gear disposed within the planet gear and meshed therewith, a ring gear rotatable about an axis substantially parallel to the spider axis, a bearing mounting for the planet gears whereby they may move bodily with the ring gear, said mounting including a driven element connected to the ring gear disposed transversely of its rotational axis, a base element in substantially parallel spaced relation thereto, a plurality of spacers disposed around the said axis and rigidly joining the driven element and base element and a plurality of planet gear bearing elements extending from the driven element to the base element and in spaced relation around the said axis, the said base element being disposed between the planet gears and the gears of the differential mechanism.

4. In an axle driving mechanism for motor vehicles, a pair of axle sections adapted to be driven, a differential gear mechanism interposed between and adapted to differentially drive the sections, said differential gearing mechanism including a gear on each axle section, an intermediate gear meshed with both of said gears and a spider rotatable on an axis substantially parallel to said axle sections and rotatably supporting said intermediate gear, a housing surrounding and supporting the differential mechanism, a pair of bearings for the housing at opposite axial ends thereof, a transverse base in the housing rigidly secured in spaced relation to one axial end of the housing, and a bearing in the base for supporting one of the said axle gears.

5. In an axle driving mechanism for motor vehicles, a pair of axle sections adapted to be driven, a differential gear mechanism interposed between and adapted to differentially drive the sections, said differential gearing mechanism including a gear on each axle section, an intermediate gear meshed with both of said gears and a spider rotatable on an axis substantially parallel to said axle sections and rotatably supporting said intermediate gear, a bearing connection between each axle gear and the spider, a housing for the mechanism, a pair of rotational bearings supporting the housing at the opposite axial ends thereof, a base rigidly connected in spaced relation to the housing internally thereof and adjacent one axial end thereof, a bearing in the base for supporting one of the axial gears and thereby supporting the spider at the point of its bearing connection with said gear.

6. In an axle driving mechanism for motor vehicles, a pair of axle sections adapted to be driven, a differential gear mechanism interposed between and adapted to differentially drive the sections, said differential gearing mechanism including a gear on each axle section, an intermediate gear meshed with both of said gears and a spider rotatable on an axis substantially parallel to said axle sections and rotatably supporting said intermediate gear, a bearing connection between each axle gear and the spider, a housing for the mechanism, a pair of rotational bearings supporting the housing at the opposite axial ends thereof, a base rigidly connected in spaced relation to the housing internally thereof and adjacent one axial end thereof, a bearing in the base for supporting one of the axial gears and thereby supporting the spider at the point of its bearing connection with said gear, a ring gear connected to the said housing, an orbit gear connected to said spider, a plurality of planet gears meshed with the orbit gear and mounted on rotational bearings supported in said base and said end of the housing, and a sun gear disposed within the planet gears and meshed therewith.

7. In an axle driving mechanism for motor vehicles, a pair of axle sections to be driven, a differential gear mechanism interposed between and adapted to differentially drive the sections, means for transmitting power to the differential mechanism, said means comprising an orbit gear connected to the differential mechanism, a plurality of planet gears meshed therewith, a sun gear disposed within the planet gear and meshed therewith, a ring gear, a driving pinion meshed with the ring gear and a mounting for the planet gears associated with the ring gear, said mounting including an annular support for the ring gear, an annular base, the base being rigidly connected to the support in parallel spaced relation therefrom by a plurality of risers connecting them and a plurality of planet gears rotatably supported on the base and annular support, the said base being disposed between the plant gears and the gears of the differential mechanism.

8. In an axle driving mechanism for motor vehicles, a pair of axle sections to be driven, a differential gear mechanism interposed between and adapted to differentially drive the sections, means for transmitting power to the differential mechanism, said means comprising an orbit gear connected to the differential mechanism, a plurality of planet gears meshed therewith, a sun gear disposed within the planet gear and meshed therewith, a ring gear, a driving pinion meshed with the ring gear and a mounting for the planet gears associated with the ring gear, said mounting including a driven element connected to the ring gear disposed transversely of its rotational axis, a base element in substantially parallel spaced relation thereto, a plurality of spacers disposed around the said axis and rigidly joining the driven element and base element and a plurality of planet gears rotatably supported on the driven element and the base element and in spaced relation around the said axis, the said base element being disposed between the planet gears and the gears of the differential mechanism.

9. In an axle driving mechanism for motor vehicles, a pair of axle sections adapted to be driven, a differential gear mechanism interposed between and adapted to differentially drive the sections, said differential gearing mechanism including a gear on each axle section, an intermediate gear meshed with both of said gears and a spider rotatable on an axis substantially parallel to said axle sections and rotatably supporting said intermediate gear, a bearing connection between each axle gear and a spider, a housing for the mechanism, a pair of rotational bearings supporting the housing at the opposite axial ends thereof, a base rigidly connected in spaced relation to the housing internally thereof and adjacent one axial end thereof, a bearing in the base for supporting one of the axle gears, a ring gear connected to the said housing, an orbit gear connected to said spider, a plurality of planet gears meshed with the orbit gear and mounted on rotational bearings supported in said base and said end of the housing, and a sun gear disposed within the planet gears and meshed therewith.

10. In an axle driving mechanism for motor vehicles, a pair of axle sections adapted to be driven, a differential gear mechanism interposed between and adapted to differentially drive the sections, said differential gearing mechanism including a gear on each axle section, an intermediate gear meshed with both of said gears and a spider rotatable on an axis substantially parallel to said axle sections and rotatably supporting said intermediate gear, a bearing connection between each axle gear and the spider, a housing for the mechanism, a pair of rotational bearings supporting the housing at the opposite axial ends thereof, a base rigidly connected in spaced relation to the housing internally thereof and adjacent one axial end thereof, a ring gear connected to the said housing, an orbit gear connected to said spider, a bearing support for the orbit gear between the said base and the differential gears, a plurality of planet gears meshed with the orbit gear and mounted on rotational bearings supported in said base and said end of the housing, and a sun gear disposed within the planet gears and meshed therewith.

11. In an axle driving mechanism for motor vehicles, a pair of axle sections adapted to be driven, a differential gear mechanism interposed between and adapted to differentially drive the sections, said differential gearing mechanism including a gear on each axle section, an intermediate gear meshed with both of said gears and a spider rotatable on an axis substantially parallel to said axle sections and rotatably supporting said intermediate gear, a bearing connection between each axle gear and the spider, a housing for the mechanism, a pair of rotational bearings supporting the housing at the opposite axial ends thereof, a base rigidily connected in spaced relation to the housing internally thereof and adjacent one axial end thereof, a ring gear connected to the said housing, an orbit gear connected to said spider, a bearing for the orbit gear coaxial with the spider, a support for the orbit gear connecting it with the said orbit gear bearing and disposed between said base and the differential gears, a plurality of planet gears connected to the orbit gear and mounted on rotational bearings supported in said base and said end of the housing and a sun gear disposed within the planet gears and meshed therewith.

12. In an axle driving mechanism for motor vehicles, a pair of axle sections adapted to be driven, a differential gear mechanism interposed between and adapted to differentially drive the sections, said differential gear mechanism including a gear on each axle section, an intermediate gear meshed with both of said gears and a spider rotatable on an axis substantially parallel to said axle sections and rotatably supporting said intermediate gear, a housing for the mechanism, a pair of rotational bearings supporting the housing and the opposite axial ends thereof, a base rigidly connected in spaced relation to the housing internally thereof and adjacent one axial end thereof, a ring gear connected to the said housing, an orbit gear connected to the spider, a bearing for the base and a bearing for the orbit gear, both said bearings being disposed coaxial with the spider, a connection between the orbit gear bearing and the orbit gear disposed between said base and the differential gears, a plurality of planet gears meshed with the orbit gear and mounted on rotational bearings supported in said base and said end of the housing, and a sun gear disposed within the planet gears and meshed therewith.

In testimony whereof I hereunto affix my signature this 21st day of November, 1929.

ARTHUR A. WIEDMAIER.